United States Patent Office 3,471,566
Patented Oct. 7, 1969

3,471,566
OXIDATION OF MERCUROUS SALTS
Hugh Leithead Roberts, Northwich, and George Wallace Hooper, Norton-on-Tees, England, assignors to Imperial Chemical Industries Limited, London, England, a corporation of Great Britain
No Drawing. Filed Mar. 2, 1964, Ser. No. 348,880
Claims priority, application Great Britain, Mar. 11, 1963, 9,565/63
Int. Cl. C07c 45/12, 49/48, 47/22
U.S. Cl. 260—604                    2 Claims

ABSTRACT OF THE DISCLOSURE

There is provided a process for making an unsaturated aldehyde or ketone by reacting an olefin containing at least three carbon atoms with a mercuric salt in an acidic aqueous medium during which reaction the mercuric salt is reduced to the corresponding mercurous salt. Concurrently with the reaction, the mercurous salt is reoxidised to the corresponding mercuric salt by means of oxygen and a metal catalyst chosen from the metals of Group VIII of the Periodic Table and from silver and gold. The reaction is carried out at a temperature between 15° and 90° C.

---

This invention relates to a process for oxidising mercurous salts to the corresponding mercuric salts; it also relates to an improved process for oxdising olefines by means of mercuric salts.

It is known that olefiines that contain a terminal $CH_2<$ group, and certain cyclic olefines for example cyclohexane, form complex addition compounds with mercuric sulphate, perchlorate, acetate and nitrate in aqueous acidic media, and that on heating these aqueous systems the olefines are oxidised to unsaturated aldehydes or ketones, and the mercuric salt reduced to the corresponding mercurous salt. Of these mercuric salts the sulphate and perchlorate are preferable for various reasons, but it is difficult to use them conveniently in a practicable process for oxidising olefines since it is not easy to oxidise the mercurous salts, particularly the sulphate, formed in the olefine-oxidation stage back to the corresponding mercuric salts. In general the oxidation of mercurous salts in acidic media to mercuric salts by means of air or cheap oxidising agents is a problem that makes difficult the establishment of continuous cyclic processes for oxidising olefines in this way.

If one could find a catalyst for the oxidation of mercurous salts in acidic media by means of air or oxygen one would have the basis of a cyclic process for oxidising olefines. Further, if the catalyst and the olefine had no effect on each other it would be possible to devise a continuous process in which an olefine and air, or oxygen, were reacted with a mixture of mercuric salt and catalyst to give an aldehyde or ketone, depending on the olefine, whilst the mercurous salt formed was continually oxidised back to the mercuric salt.

It is the object of this invention to provide such catalysts and such a process.

According to one aspect of our invention we provide a process for oxidising a mercurous salt to the corresponding mercuric salt comprising reacting the mercurous salt in an acidic aqueous medium with oxygen in the presence of a metal catalyst chosen from the metals of Group VIII of the Periodic Table, and from silver and gold, the chosen metal not being soluble in or attacked by the acidic aqueous medium.

According to another aspect of the invention we provide a process for making an unsaturated aldehyde or ketone comprising reacting an olefine containing at least three carbon atoms with a mercuric salt and oxygen is an acidic aqueous medium in the presence of a metal catalyst as hereinbefore defined.

Of the metal catalyst hereinbefore defined palladium, platinum and silver are particularly useful.

The oxygen can be supplied to the reaction system in elementary form or as air.

The metal catalyst is preferably in finely divided form and supported on an inert material for example silica, alumina. A convenient way of preparing such a supported catalyst is to wash silica gel with concentrated hydrochloric acid to remove all traces of alkali and then with water until the gel is free of acid. The gel is then saturated with a solution of chloride or nitrate of the chosen metal, for example palladous chloride dissolved in hydrochloric acid, and thereafter dried in a stream of inert gas, for example nitrogen, after which it is heated in dry hydrogen at about 150° C. until the salt has been reduced to the metal. From 1 to 5% by weight of metal on silica is suitable.

The acid of the acidic aqueous medium is preferably the one corresponding to the mercuric salt. For example, one would use mercuric sulphate with sulphuric acid, mercuric perchlorate with perchloric acid, mercuric acetate and nitrate with acetic and nitric acids respectively. If the oxidation of the mercurous salt and the reaction of the olefine with the mercuric salt are to be carried out concurrently in a single reaction system particularly useful combinations are mercuric sulphate/sulphuric acid and mercuric perchlorate/perchloric acid. The mercuric nitrate/nitric acid combination may be less suitable owing to side reactions that can yield nitrogen dioxide; in the mercuric acetate/acetic acid combination lower olefines such as propylene boil out of the system at atmospheric pressure at temperatures too low for a satisfactory rate of oxidation; by conducting the oxidation at pressures above atmospheric this loss of olefine could be avoided.

The oxidation of the mercurous salt to mercuric salt in the absence of olefine is conveniently carried out at temperatures from about 60° to 90° C. In dilute solutions, that is to say up to about 1% by weight, the oxidation can be carried on until about 90% of the mercurous salt has been converted into the corresponding mercuric salt. In more concentrated solutions the proportion of the mercurous salt oxidised is lower the more concentrated the solution, falling to about 50% for concentrations of the order of 10%. It is probable that the oxidation reaction is reversible and an equilibrium is reached as the concentration of mercuric ions in the system increases. A convenient concentration for the acid in the acidic oxidation system is from 0.50 to 2.0 normal, though, higher concentrations may be used if they are necessary for bringing the mercurous salt into solution. The proportion of catalyst in the oxidation system admits of much latitude, but is conveniently such that the amount of metal therein is from 5 to 50% by weight of the mercurous salt.

If the oxidation of the mercurous salt and the reaction of olefine with the mercuric salt are to be carried out concurrently in a single reaction system the temperature range over which oxidation of the mercurous salt takes place may be wider, for example from about 15° C. to 90° C. This comes about because under some conditions some olefines form complexes with mercuric salts more readily in a temperature range of about 15° C. to 60° C., though after the complex has been formed it is usual to raise the temperature, for example to 80°–90° C., in order to complete the oxidation of the olefine and to liberate the resulting aldehyde or ketone by distillation for example Mercurous salt appears to be formed over the whole temperature range of say 15° C. to 90° C. though the bulk of it is liberated in the upper part of the range. It is thus advisable to have oxygen and the metal catalyst present in the olefine/mercuric salt reaction system all the time from the beginning onwards.

Olefines that can be oxidised by the process of the invention concurrently with the oxidation of the mercurous salt contain at least three carbon atoms, for example propylene to give acrolein, isobutene to give methacrolein; 1-butene to give methyl vinyl ketone, and cyclohexene to give cyclohexenone.

Example 1 illustrates the preparation of a palladium catalyst; Examples 2 and 3 illustrate one aspect of the invention namely the oxidation of mercurous salts to mercuric salts. Example 4 illustrates the concurrent oxidation of mercurous salt to mercuric salt and of olefine to aldehyde. Examples 5 and 6 illustrate the use of silver and platinum respectively as the catalyst metal in the oxidation of mercurous sulphate.

EXAMPLE 1

Silica gel was washed with concentrated hydrochloric acid and then with water until the washings were free of acid. To 10 g. of the gel was added a solution of 0.89 g. palladium chloride in 13 ml. of 2 N hydrochloric acid and the mixture stirred; after which the impregnated silica was dried at 50° C. in a current of nitrogen and the palladous chloride reduced to metallic palladium in a current of dry hydrogen at 150° C. The catalyst so formed was crushed to a fairly fine powder.

EXAMPLE 2

1 g. of the catalyst prepared as in Example 1 was mixed with 0.108 g. mercurous sulphate in 50 ml. of N sulphuric acid. The mixture was heated to 90° C. and a current of air passed for 10 minutes at a rate of 25 litres/hour, after which the mixture was filtered. The filtrate was found to contain mercuric sulphate equivalent to 0.90 g. mercurous sulphate, that is to say 83–84% of the mercurous sulphate had been oxidised.

EXAMPLE 3

In an experiment similar to that described in Example 2, 0.150 g. mercurous perchlorate in 60 ml. of N perchloric acid yielded mercuric perchlorate equivalent to 0.116 g. mercurous perchlorate, that is to say 77–78% of the mercurous perchlorate had been oxidised.

EXAMPLE 4

26.4 g. of the catalyst prepared as in Example 1 was mixed in a 2-litre flask fitted with a condenser with 1 litre of sulphuric acid (1.0 normal) and 50 g. of mercuric sulphate. Oxygen in excess and propylene at a rate of 1.4 litres per hour were bubbled through the mixture for 30 minutes whilst the temperature was gradually raised from 25° C. to 60° C., and for a further 3½ hours thereafter whilst the temperature was held at 80°–90° C. At the end of this period 3.3 g. of acrolein had been condensed and collected, and analysis of the residual liquid in the flask showed it to contain 6.8 g. mercuric sulphate. When the reaction was repeated with the same weights of materials but without oxygen and catalyst the amount of acrolein formed was 2.3 g., and the residual liquid contained no detectable mercuric sulphate.

EXAMPLE 5

A catalyst consisting of finely divided silver supported on silica gel and containing 5% by weight of silver was prepared and 1 g. of it mixed with 0.15 g. mercurous sulphate in 50 ml. of N sulphuric acid. The mixture was heated to 90° C. and oxidised for 60 minutes with a current of air passed through at the rate of 25 litres/hour. Some 55% of the mercurous sulphate was oxidised to mercuric sulphate.

EXAMPLE 6

A catalyst consisting of finely divided platinum supported on silica gel and containing 5% by weight of platinum was used in an oxidation of mercurous sulphate similar to that described in Example 5, but carried out at 60° C. Some 35% of the mercurous sulphate was oxidised to mercuric sulphate.

What we claim is:

1. A process for making an acrolein by reacting a propylene with a mercuric salt in an acidic aqueous medium whereby the mercuric salt is reduced to the corresponding mercurous salt, characterised by concurrently with the propylene reaction re-oxidising in said acidic aqueous medium said mercurous salt to the corresponding mercuric salt by means of oxygen and a metal catalyst chosen from the group consisting of palladium, platinum and silver, the chosen metal not being soluble in or attacked by said acidic aqueous medium and wherein the reaction is carried out between 15° and 90° C.

2. A process as claimed in claim 1 in which the mercuric salt is mercuric sulphate or mercuric perchlorate and the acidic aqueous medium includes respectively sulphuric acid or perchloric acid, and the metal catalyst is finely divided palladium supported on silica.

References Cited

UNITED STATES PATENTS 3,153,083   10/1964   Smidt et al. _____ 252—416
2,197,258   4/1940    Macallum _____ 260—604

BERNARD HELFIN, Primary Examiner

R. H. LILES, Assistant Examiner

U.S. Cl. X.R.

260—586, 597